Jan. 17, 1933.  J. MAYO  1,894,881
LEER FEEDING DEVICE
Filed May 1, 1931   6 Sheets-Sheet 1

Fig. 1.

INVENTOR
John Mayo
By Green & McCallister
His Attorneys

Patented Jan. 17, 1933

1,894,881

UNITED STATES PATENT OFFICE

JOHN MAYO, OF CARNEGIE, PENNSYLVANIA

LEER FEEDING DEVICE

Application filed May 1, 1931. Serial No. 534,266.

This invention relates to conveyor mechanisms, and in particular to conveyor mechanisms for conveying hot articles such as glassware received from a mold or forming machine.

In automatically conveying glassware from the forming machine to an annealing leer, for example, it is of prime importance to have a conveying mechanism that will not mark, check, or crack the glassware and which will deliver the ware to the leer in an upright position so that the ware will not be distorted out of shape.

Also, the amount of time during which the ware is exposed to the atmosphere after leaving the forming machine and before it enters the leer, must be controlled in order to produce the best annealing of glassware. For example, large, heavy ware should not be delivered to the annealing leer as soon as small, light ware, because as it leaves the forming machine it carries an excess of heat, which must be given off before entering the leer, otherwise the excess heat will cause the ware to lose its shape while being annealed.

On the other hand, small, light ware should be delivered to the leers as soon as possible after leaving the mold or forming machine, since it cools quickly with the resulting tendency to set up detrimental strains in the ware.

Conveyors for hot articles such as glassware are now in use, but all such devices known to me are more or less unsatisfactory, in that a high percentage of the ware is cracked, broken or marked by the conveyor or conveying devices.

An object of this invention is to provide a device for conveying glassware as, for example, from a forming machine to an annealing leer which is so constructed and arranged that checking, cracking, marking and upsetting of the ware, while on the conveyor, is substantially, if not wholly, eliminated.

A further object of my invention is to produce a device which will convey the ware in an upright position and at a rate of speed within the control of the operator, so that the ware may be exposed to the atmosphere the desired length of time.

A further object is to produce mechanism for automatically and efficiently conveying glassware from a forming machine to the leer which materially reduces the percentage of broken ware and thereby lowers the manufacturing costs.

A further object is to produce a device having improved mechanism arranged to receive the ware from the forming machine take out mechanism, and to convey the same to the leer feeding mechanism.

A still further object is to produce a mechanism for automatically conveying glassware which engages only the lower surface of the ware.

These and other objects which will be made apparent to those skilled in this particular art throughout the further description, are accomplished by means of this invention, one embodiment of which is described in the following specification and illustrated in the accompanying drawings, wherein:

Throughout the several figures of the drawings, like reference characters refer to like parts of the structure.

As illustrated, my improved conveyor includes a series of closely spaced rollers arranged in alternate long and short pairs mounted in a substantially horizontal plane. The conveyor rollers are constantly driven from a common source so that all the rollers rotate at the same speed.

The ware, as it leaves the forming machine, is delivered to a ware-receiving mechanism which is mounted over the front or receiving end of the conveyor. The ware-receiving mechanism consists essentially of an adjustable vertically reciprocating member provided with a series of normally idle but rotatably mounted rollers on which the ware is placed by the forming machine take out mechanism. The reciprocating member is synchronized with the forming machine take out mechanism so that it moves to receive each article delivered by the take out mechanism. When the reciprocating member moves to a position such that it cooperates with the conveyor, the normally idle rollers carried by it, come into contact with a series of rollers associated with the conveying mechanism and which are rotating in the opposite direction from the rollers of the conveyor. The rollers of the reciprocating member by such engagement are thereby rotated in the same direction as the conveying rollers of the conveyor, and move the article carried thereon to the conveyor.

The conveyor rollers deliver the glassware to a constantly rotating disc member located at the rear end of the conveyor and in front of the leer. As the disc rotates, the ware moved onto it by the conveyor rollers is carried around into engagement with a stationary arm which deflects the ware off of the disc and directs it onto a conveyor which carries the ware through the leer.

So that my conveyor may be used to convey all kinds and sizes of glassware, I employ rollers which are relatively small in diameter. I prefer to use rollers which are not over ½ inch in diameter so that the surface of each roller forms a hair line support for the articles being conveyed. Rollers of this size do not check or chill the ware, and consequently do not set up strains therein. These relatively small rollers are placed close together in the conveyor permitting relatively small articles to be handled by the conveyor.

Referring to the drawings in detail, I have shown my conveyor mechanism mounted on a frame which comprises a front supporting member 10 and a rear supporting member 11. The front and rear supporting members are held in position by lower side members 12 and upper side members 13. The side connecting members may be made from angle irons or any other suitable material. The frame is supported on wheels 14 journaled on axles 15, carried by the front and rear supporting members, making the conveying device readily movable to position between the forming machine and the annealing leer.

Mounted on the top of the front and rear supporting members are side plate members 16 which are arranged parallel to each other and maintained in proper alignment by spacers 17 secured therebetween. The end spacers are fastened directly to the tops of the supporting members.

*Main conveyor mechanism*

The conveyor proper comprises a series of closely spaced rollers 18 journaled in openings in the upper edges of the side members 16 and arranged in a substantially horizontal plane therein.

Each of the rollers 18, which form the main conveyor, has a portion 20 extending beyond the plane of one of the side plate members, while the opposite end of the roller is substantially flush with the outside of the other side member.

The extended portions 20 on adjacent rollers are disposed on opposite sides of the side members 16, while the extended portions on each side of the side members are alternately long and short. The rollers, therefore, are grouped in alternately long and short pairs. The extended portion 20 of each roller is provided with a sprocket wheel 21 which is secured thereto by a set screw 22 extending through the hub 23 of the wheel. Since the extended portions on each of the rollers on one side of the side members are alternately long and short, sufficient space is provided between the relative small rollers to permit the sprocket wheels on each of the long and short pairs to be in alignment with the wheels on the other long and short pairs, respectively, making it possible to drive all rollers from a common source.

Figure 10:
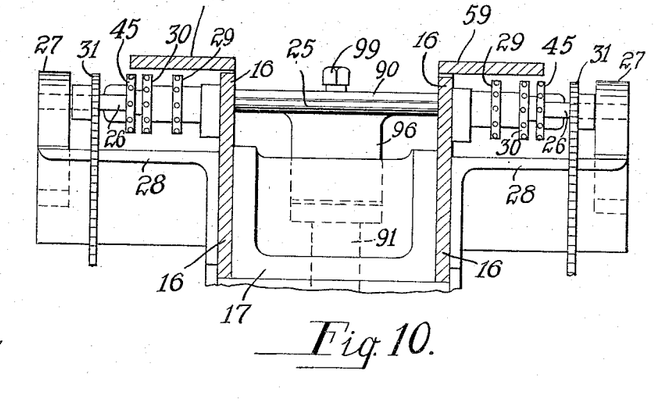
Fig. 10 is an enlarged view in section, taken on line X—X of Fig. 1, but it should be noted that the rollers 18 are omitted for convenience of illustration.

In order to drive all the rollers 18 of the conveyor from a single source on each side of the plate 16 the two pairs of rollers at the discharge end of the conveyor, designated as 24 and 25, respectively, are of special construction and have longer extended portions than the remaining rollers 18. The pair of rollers 24 which act as drivers for the conveyor, each have a portion 26 extending beyond the side members 16 on opposite sides thereof. The extended portion of each of the rollers 24 is journaled at its extreme outer end in a bearing 27 which is supported in a bracket 28 (Figs. 2 and 10) secured to the side member 16. The portion 26 of each roller 24 has three sprocket wheels, 29, 30 and 31 (Fig. 10), mounted thereon which are so arranged that the sprocket wheels 29 are in alignment with the sprocket wheels 21 on the short rollers 18 and are connected therewith by an endless sprocket chain 32, while the sprocket wheels 30 are in alignment with the wheels 21 on the long rollers 18 and are connected therewith by an endless chain 33.

Figure 1:
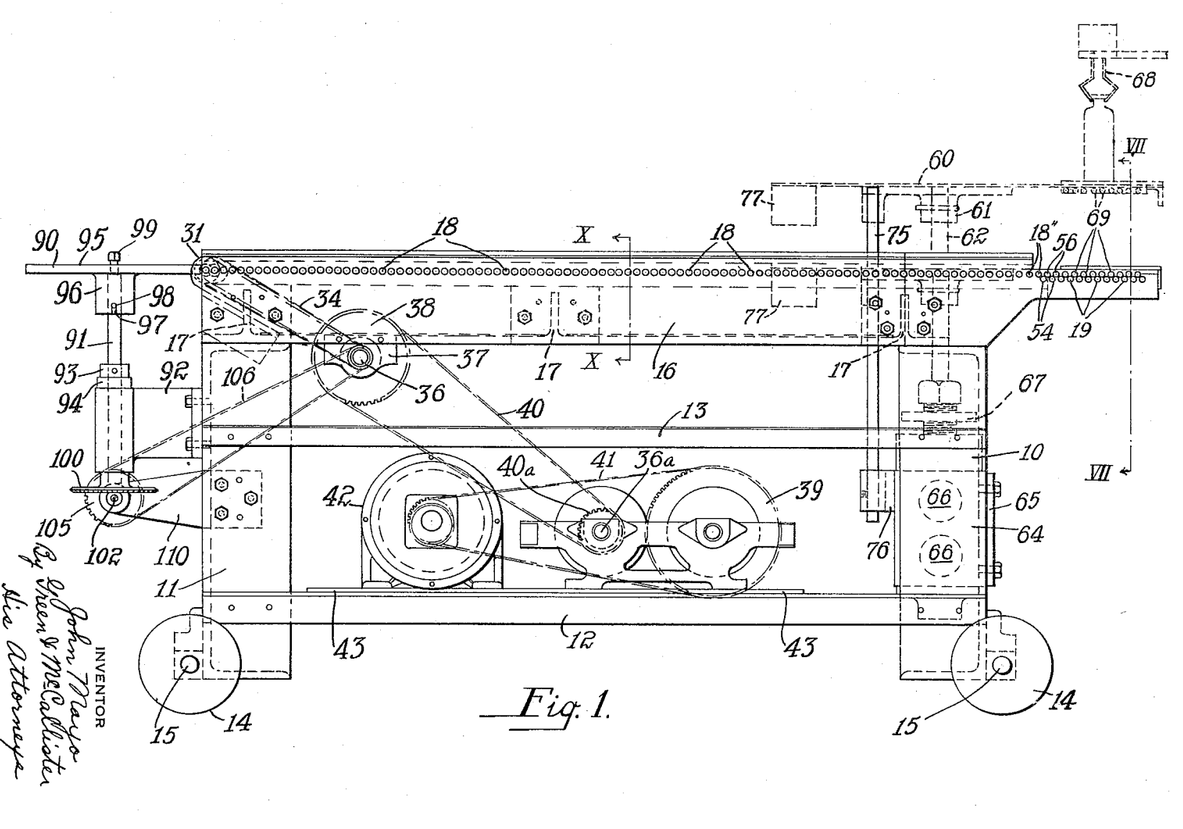
Figure 1 is a view in side elevation of my improved conveying device.
Figure 2:
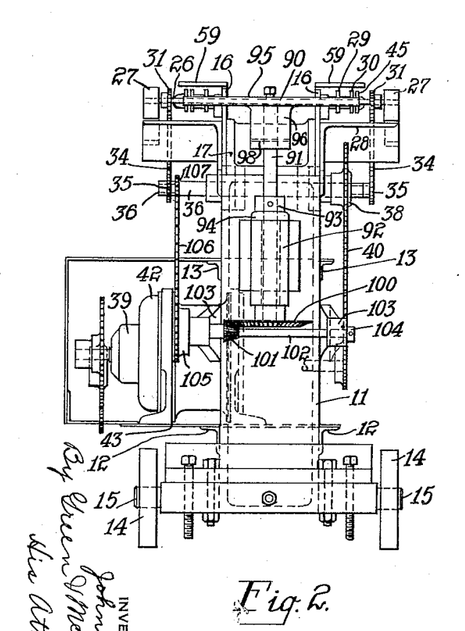
Fig. 2 is a view in end elevation of the rear of the conveyor showing the discharge mechanism.
Figure 11:
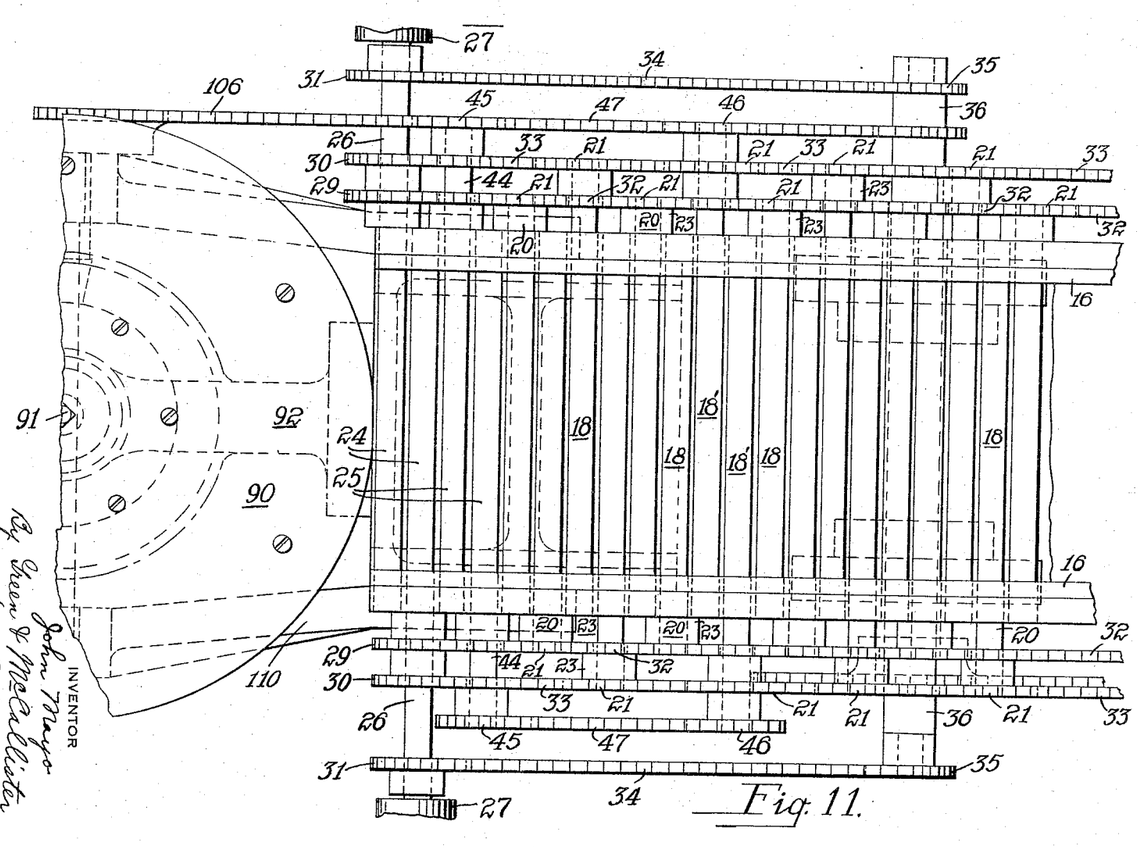
Fig. 11 is an enlarged plan view of the discharge end of the conveyor having portions thereof broken away.

Each roller 24 is driven by an endless sprocket chain 34 which passes over the sprocket 31 carried by the extension 26, and a sprocket wheel 35 carried by a shaft 36 mounted in brackets 37 secured to the side plate members 16 (see Figs. 1, 2 and 11). The shaft 36 has a sprocket wheel 38 secured thereto which is connected by a sprocket chain 40 to the sprocket 40a on a variable speed transmission 39. The transmission is driven by an endless sprocket chain 41 connected to a motor 42 by means of a suitable sprocket wheel (Fig. 1). The motor and transmission are mounted on a plate 43 secured to the lower side members 12 of the frame.

In order to maintain the sprocket wheels 29 and 30 on each of the rollers 24 in line with the sprocket wheels on the short and long rollers, respectively, so that all the conveyor rollers may be driven by the rollers 24, the rollers 25, that is, the next to the last pair of rollers in the conveyor are each provided with a portion 44 extending beyond the side member 16 which is longer than the extending portions 20 on the long rollers 18. Such an arrangement is necessarily due to the small diameter and the relatively close spacing of the rollers 18 comprising the conveyor.

The rollers 25 are each driven by a sprocket chain 47 which passes over a sprocket wheel 45 secured to the extended portion 44 on the rollers 25 and a sprocket wheel 46 which is mounted on the ends of one of the long pair of rollers, designated as 18', which have been made extra long for that purpose. The rollers 24, therefore, drive the rollers 18' through the sprocket wheel 21 and sprocket chain 33 and these rollers in turn drive the rollers 25 through the sprocket chain 47. It is to be understood that any of the rollers 18 may be selected as the driving rollers for the rollers 25.

Receiving end of conveyor

Associated with the conveyor rollers 18 at the front or ware-receiving end of the conveyor are a series of rollers 19 which are journaled in the side members 16 in a plane slightly lower than the plane of the main conveyor rollers 18. These rollers 19, which engage the idle rollers on the reciprocating ware-receiving mechanism, when the same is in cooperating positions with the conveyor rollers 18, are driven in a reverse direction to the rollers 18 so that the idle rollers of the ware-receiving member will turn in the same direction as the rollers 18.

The rollers 19 are driven by the first pair of the main conveyor rollers designated as 18", around which the sprocket chains 31 are returned to the driving rollers 24. The rollers 18" have gears 55 secured thereto between the side members 16 and the sprocket wheels 21 which mesh with gears 53 mounted on the ends of the rollers, designated as 54, which are adjacent the rollers 18". The remaining rollers 19 are driven through a train of gears associated with the gears 53 on the rollers 54. Each of the gears 53 mesh with an idler gear 51 which is mounted on an idler pin 52 extending from the side member 16. Each of the gears 52 in turn meshes with a gear 50 mounted on the end of each of the next pair of rollers 19. These gears 50 in turn mesh with another idler gear 51 which mesh with gears 50 on the next pair of rollers 19. Thus all the rollers 19 are driven directly by the rollers 18" which are connected to the driving rollers 24 through the sprocket chain 31.

A pair of rollers 56 are mounted in the side members 16 adjacent the rollers 18" and above the rollers 54. The rollers 56 are in engagement with the rollers 54 and are frictionally driven by the rollers 54. The rollers 56, therefore, rotate in the same direction as the main conveying rollers. The rollers 56 are so arranged that the tops thereof are in the same plane as the tops of the rollers 18.

Figures 3, 12:
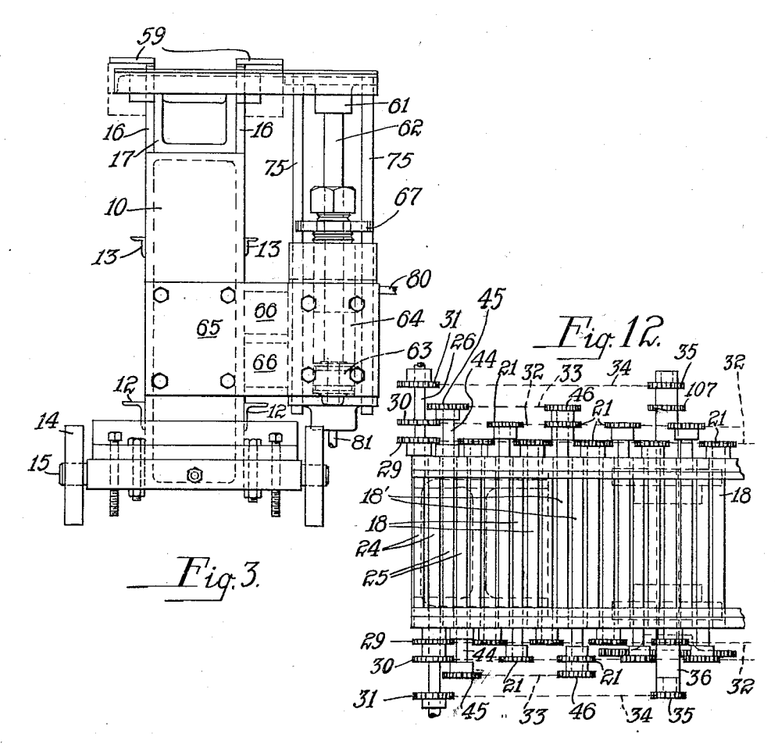
Fig. 3 is a view in elevation of the front of the conveyor illustrating the ware-receiving mechanism.
Fig. 12 is an enlarged partial plan view of the discharge end of the conveyor.

The rollers 19 are undercut, as at 58, to provide ample space for broken glass and dirt to fall through the conveyor. When the machine is in operation, the rollers 18 and 56 are constantly driven and caused to rotate in a direction toward the discharge end of the conveyor, while the rollers 19 and 54 at the receiving end of the conveyor are driven in the opposite direction. A plate 59 (Figs. 3 and 10) is secured to the top of the side members 16 and extends over the sprocket wheels 21 and chains forming a shield for protecting the operator.

Ware-receiving mechanism

Figures 4, 5:
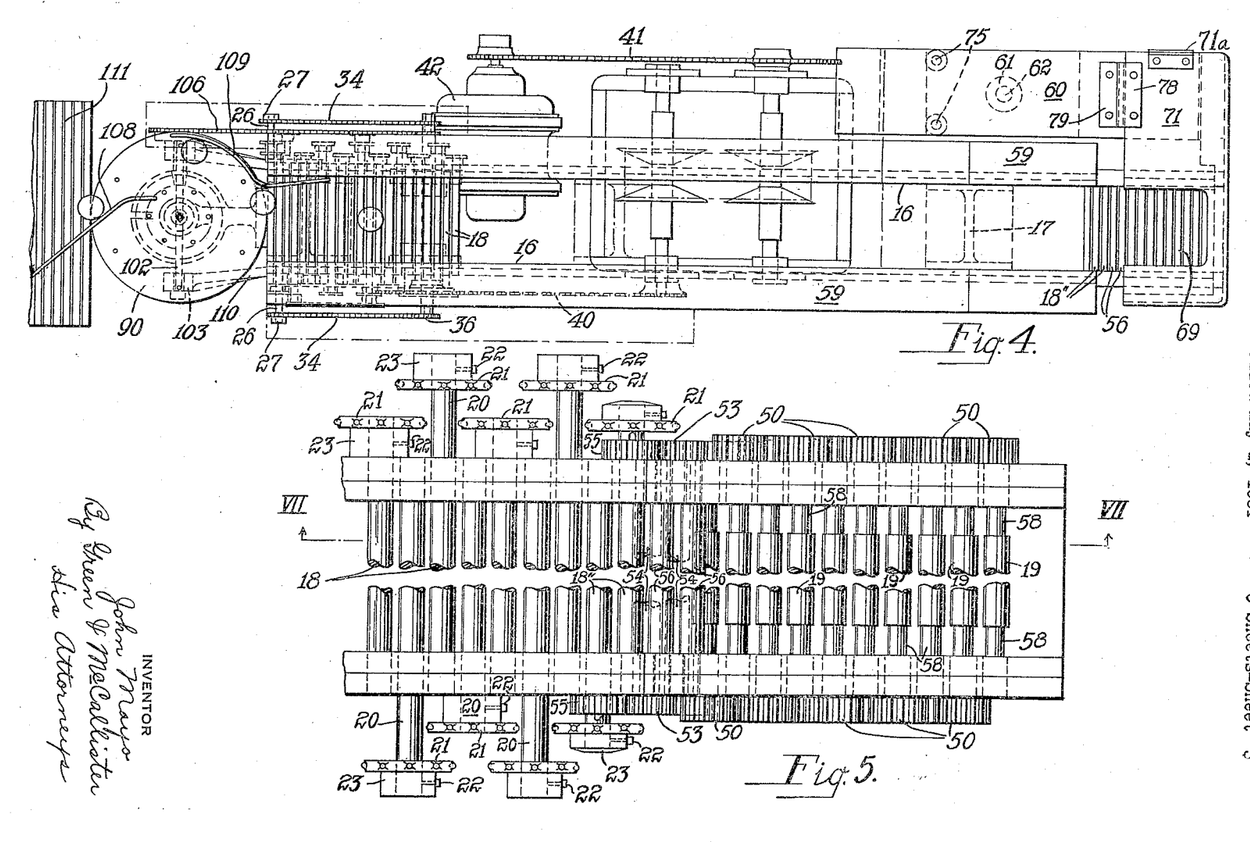
Fig. 4 is a top plan view of the conveyor having a portion of the conveying rollers removed for clearness.
Fig. 5 is an enlarged plan view of the front end of the conveyor with the ware-receiving mechanism removed. The sprocket chains are omitted for convenience of illustration.
Figure 6:
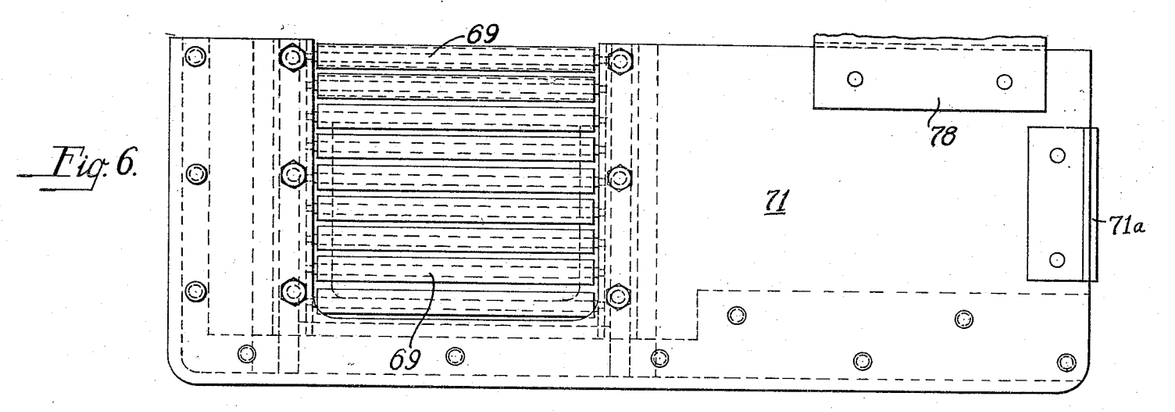
Fig. 6 is a top plan view of a portion of the ware-receiving mechanism.
Figure 7:
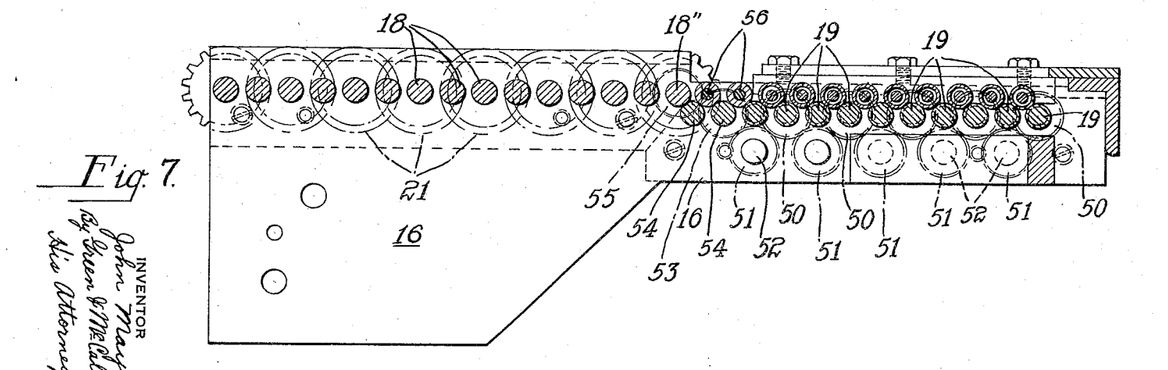
Fig. 7 is an enlarged view in section taken on lines VII—VII of Fig. 5.
Figure 8:
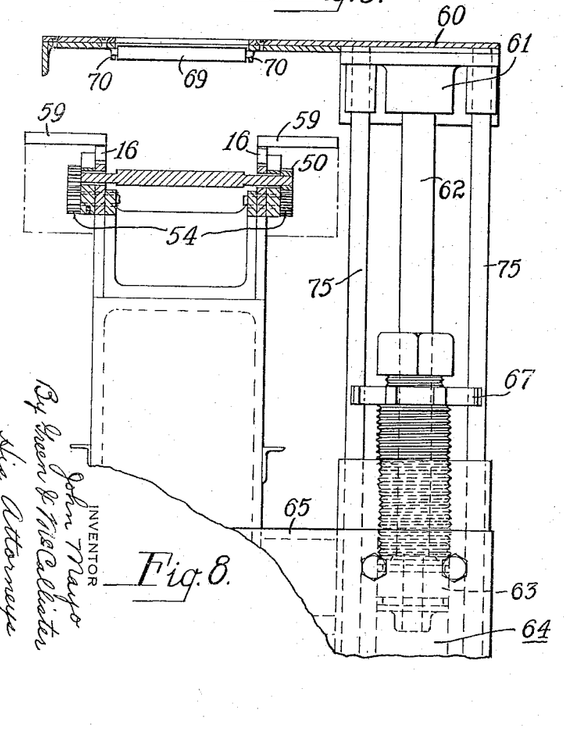
Fig. 8 is an enlarged view in section, taken on line VIII—VIII of Fig. 1, showing the ware-receiving mechanism in elevated position.
Figure 9:
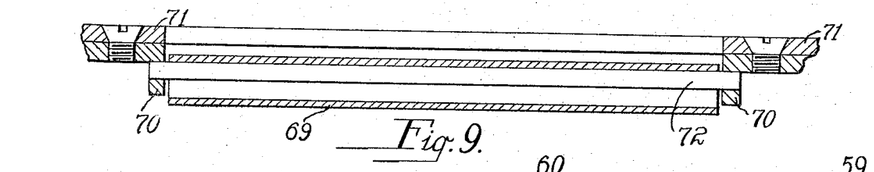
Fig. 9 is an enlarged partial view of the ware-receiving mechanism showing the roller construction in section.

The glassware is taken from the forming machine by some suitable article take out discharging mechanism associated with the forming machine and placed on a vertically reciprocating ware-receiving member which is mounted over the front or receiving end of the conveyor. The ware-receiving mechanism comprises an elevator plate 60 (Figs. 1, 4 and 8), which is supported on a member 61, mounted on the upper end of a vertically extending piston rod 62, best shown in Figs. 3 and 8. The lower end of the rod 62 is connected to a piston 63, which is mounted in a cylinder 64. The cylinder 64 is supported on a plate 65 secured to the front supporting member 10, and held in position relative thereto by spacer blocks 66.

The elevator plate 60 is raised and lowered by air admitted to the cylinder on opposite sides of the piston 63, as at 80 and 81. The air passages 80 and 81 may be connected directly with the air used to operate the forming machine, or to a suitable trip valve, not shown, actuated by and synchronized with the forming machine so that the elevator will be raised to ware-receiving position each time the forming machine take out mechanism swings away from the mold or forming machine.

The height to which the elevator 60 is raised by the piston rod 62 is controlled by a combination stuffing box and adjusting nut 67 which is mounted in the cylinder head and which limits the up stroke of the piston. The adjusting nut 67 permits the elevator plate to be raised to the proper height under the forming machine take out mechanism regardless of the size of ware being made in the mold.

When the elevator plate 60 is raised to its uppermost position, the forming machine take out mechanism, designated as 68, places the ware on a series of idle rollers 69, journaled in members 70 depending from the legs of a U-shaped plate 71 which is hinged to and carried by the elevator plate. The rollers 69 are formed from tubing which is journaled on rods 72 before the same are secured in the depending members 70. A channel member 71a, which is placed over the edges of the plates 60 and 71 prevent the plate 71 from tilting or tipping.

When the elevator plate 60 is lowered so that it cooperates with the main conveyor rollers 18 the rollers 69 are received between the rollers 19 which are spaced apart for that purpose. The rollers 19 are arranged in a plane slightly lower than the plane of the main conveying rollers 18 so that the rollers 69, when in engagement therewith, will be in the same plane as the rollers 18. As the rollers 19 are constantly rotating in a reverse direction to the rollers 18, the rollers 69 will be rotated in the same direction as the rollers 18, due to the frictional engagement with the rollers 19, and move the ware placed thereon by the forming machine take out mechanism onto the conveyor rollers 18.

To maintain the reciprocating ware-receiving mechanism in proper position over the front or receiving ends of the conveyor, the elevator plate 60 is provided with guide rods 75 which are slidably mounted in brackets 76 secured to the front supporting member 10, and which prevent the piston rod and elevator plate from turning relative to the cylinder. The plate 60 is also provided with a weight 77 which tends to balance the plate 71 and ware receiving rollers.

So that the rollers 69 of the ware-receiving mechanism will properly seat on the rollers 19 of the conveyor, the plate 71, carrying the rollers, is provided with a member 78 having a groove therein which registers with the tongue of a similar member 79 secured to the elevator plate 60. This male and female arrangement acts as a guide which permits movement between the two plates and maintains the rollers 69 in alignment with the rollers 19.

*Ware discharging mechanism*

The ware moves from the ware receiving rollers 69 over the main conveying rollers 18 to a ware discharging mechanism which delivers the ware to the annealing leer. The ware discharging mechanism comprises a disc 90 slidably mounted on a vertical shaft 91 positioned at the rear of the frame and supported in a bearing bracket 92, which is fastened to the rear supporting member 11. The shaft 91 is supported in the brackets by a set collar 93 and a thrust bearing 94. The disc is circular in form and may be covered with a thin piece of heat insulating material 95, such as asbestos board, to prevent cracking and checking of the glass ware coming in contact therewith. The disc 90 has a hub 96 provided with a longitudinal slot 97 which receives a pin 98 which extends horizontally through the shaft 91. This forms a driving connection between the shaft and disc. The disc may be adjusted vertically with relation to the shaft by an adjusting screw 99 which extends through the face of the disc and rests on the end of the shaft 91.

The lower end of the vertical shaft 91 has a bevel gear 100 secured thereto which meshes with a bevel driving pinion 101, keyed on a horizontal shaft 102, journaled in bearings 103, supported on a bracket 110 secured to the rear supporting member. Set collar 104 holds the shaft 102 in position in the bearings. The shaft 102 has a sprocket wheel 105 secured thereto which is driven by a sprocket chain 106 passing over the sprocket wheel 105 and a sprocket wheel 107 which is secured to the driven shaft 36. When the machine is operating, the discharging disc 90 is constantly rotated by the above described mechanism and carries the ware delivered thereto by the conveyor rollers 18 around until the same comes in contact with a stationary arm or a deflector 108 which deflects the ware off the disc on to the leer conveyor, a portion of which is indicated at 111. The ware is prevented from upsetting while on the disc by an auxiliary deflector 109.

*Operation*

In operation, the ware-receiving mechanism is elevated, which positions the idle rollers 69 under the forming machine take out mechanism 68 as it swings away from the molds. The take out mechanism 68 after placing the piece of ware on the idle rollers 69 swings back toward the forming machine and the rollers 69 are lowered into engagement with the rotating rollers 19 on the front end of the conveyor. The frictional engagement between rollers 19 and the rollers 69 causes the rollers 69 to rotate and move the ware onto the rotating rollers 18. The piece of ware travels across the rollers 18 onto a rotating disc 90 which is positioned in front of the leer. The disc carries the ware around to a position in front of the leer conveyor, determined by an arm 108 which deflects the ware onto the leer conveyor.

As soon as the ware has been transferred from the rollers 69 to the main conveyor rollers 18, the ware-receiving mechanism is again elevated and another cycle of operation is started.

It is readily apparent from the foregoing description that the speed of rotation of the conveyor rollers may be so regulated that the ware will be conveyed to the leer at the desired or ideal rate of speed and in a certain elapsed time after leaving the forming machine. Such a speed control makes it possible to handle any size ware on the conveyor and if the speed is properly regulated, prevents the distortion of large ware and the setting up of temperature strains in small ware. The speed control also permits the utilization of the initial heat or heat contained in the ware as it leaves the mold or forming machine, in the heating of the leer itself, and as a result, less fuel is required in heating the leer.

It is also apparent that the ware leaving the forming machine is delivered to a stationary portion of my conveyor, therefore the danger of having the ware upset and break on the conveyor, as frequently happens where the ware is delivered to a moving conveyor, is reduced to a minimum.

While I have described one embodiment of my invention, it is to be understood that the invention is not limited to the construction herein specifically illustrated, but can be embodied in other forms without departing from the spirit of the invention or the scope of the appended claims.

What I claim is:

1. The combination in a device for conveying glassware from a forming machine to an annealing leer, comprising a reciprocating member having a plurality of idle rollers adapted to receive the ware from said forming machine, a conveyor formed from a plurality of closely spaced constantly rotating rollers, means for rotating said idle rollers so as to transfer said ware from said reciprocating member to said roller conveyor, and means for discharging said ware from said conveyor.

2. The combination in a device for conveying glassware from a forming machine to an annealing leer, comprising a reciprocating member having a plurality of idle rollers adapted to receive the ware, a conveyor formed from a plurality of closely spaced constantly rotating rollers, means geared to said constantly rotating rollers adapted to engage and rotate said idle rollers for transferring said ware to said conveyor, and means for discharging said ware from said conveyor.

3. The combination in a device for conveying glassware from a forming machine to an annealing leer, comprising a reciprocating member having a plurality of idle rollers adapted to receive the ware, a conveyor formed from a plurality of closely spaced constantly rotating rollers, rollers geared to said constantly rotating rollers adapted to engage and rotate said idle rollers so as to convey said ware to said conveyor and means for deflecting the ware from said conveyor to the leer.

4. The combination in a device for conveying glassware from a forming machine to an annealing leer, comprising a reciprocating member having a plurality of idle rollers adapted to receive said ware from the forming machine, a conveyor formed from a plurality of closely spaced rollers, means for constantly rotating said rollers, means associated with said constantly rotating rollers for engaging and rotating said idle rollers for transferring the ware positioned thereon to said conveyor and means for discharging said ware from said conveyor.

5. The combination in a device for conveying glassware form a forming machine ton an annealing leer comprising a reciprocating member having a plurality of idle rollers for receiving the ware from the forming machine take out mechanism, a conveyor formed from a plurality of closely spaced rollers arranged in alternate long and short pairs, means for constantly rotating said rollers, means for rotating said idle rollers so as to transfer said ware from said reciprocating member to said roller conveyor, and means for discharging said ware from said conveyor.

6. The combination in a device for conveying glassware from a forming machine to an annealing leer, comprising a reciprocating member having a plurality of idle rollers on which the ware is placed by the forming machine take out mechanism, a conveyor formed of a plurality of closely spaced rollers arranged in alternate long and short pairs, each roller in each pair having a driving member connected thereto on alternate ends, means for constantly driving said driving members, so as to rotate said rollers, means for rotating said idle rollers so as to transfer said ware from said reciprocating member to said roller conveyor, and means for discharging said ware from said conveyor.

7. The combination in a device for conveying glassware from a forming machine to an annealing leer, comprising a reciprocating member having a plurality of idle ware-receiving rollers, a conveyor formed from a plurality of rollers having driving means on the ends thereof arranged in staggered formation, means associated with said driving means for constantly rotating said rollers, means for rotating said idle rollers so as to transfer said ware from said reciprocating member to said roller conveyor, and means for discharging said ware from said conveyor.

8. A device for conveying glassware from a forming machine to an annealing leer comprising in combination, a vertically reciprocating member having a plurality of idle ware-receiving rollers, a series of constantly rotating rollers adapted to engage and rotate said idle rollers when said reciprocating member is in its lowermost position, a conveyor formed from a plurality of closely spaced rollers rotating in a direction opposite to said first mentioned driven rollers and arranged in a horizontal plane so that the top of said rollers is in the same plane as the rollers on said reciprocating member when the same is in its lowermost position, a rotating disc for receiving said ware from said conveyor rollers and a deflector for wiping said ware off of said disc into the leer.

9. A conveyor comprising a supporting member, a series of closely spaced rollers mounted in a horizontal plane on said supporting member and arranged therein in alternate long and short pairs, a series of rollers at one end of said supporting member arranged in a plane slightly below the plane of said first mentioned rollers, rotatable ware-receiving members periodically engaging said last mentioned rollers, means for constantly rotating said first named rollers in one direction, and means for rotating said last mentioned rollers in the opposite direction whereby said ware-receiving members are caused to rotate in the same direction as the first-named rollers.

10. A conveyor comprising a supporting member, a series of closely spaced rollers mounted in said supporting member and arranged therein in alternately long and short pairs, a second series of rollers at one end of said supporting members and geared to one pair of the first mentioned series of rollers, rotatably mounted ware-receiving rollers positioned over said second series of rollers periodically in engagement therewith, and means for driving said first mentioned rollers so as to rotate the same in one direction and the second series in the opposite direction whereby said ware-receiving rollers are rotated in the same direction as said first series of rollers.

11. The combination in a conveying device of a supporting member having a series of rollers constantly rotating in one direction and arranged therein in alternately long and short pairs, a second series of rollers in said supporting member constantly rotating in the opposite direction from said first mentioned rollers, a vertically-reciprocating member having a series of idle rollers rotatably mounted therein and positioned over the second series of rollers in said supporting member, and means for raising and lowering said reciprocating member so as to bring the idle rollers carried thereby into and out of contact with said second series of rollers.

12. A device for transferring ware from a forming machine comprising in combination a conveyor, idle ware-receiving means, and mechanism for raising said means to ware-receiving position, and for lowering said means into engagement with a portion of said conveyor to set the same in motion and transfer the ware placed thereon to the conveyor.

13. The combination in a device for conveying glassware, comprising a main driven conveyor, an auxiliary conveyor driven in the opposite direction to said main conveyor, and an idle ware receiving conveyor adapted to periodically engage said auxiliary conveyor and to be set in motion thereby.

14. The combination in a device for conveying glassware, comprising a main driven conveyor, an auxiliary conveyor driven in the opposite direction from said main conveyor, a reciprocating member, and an idle ware-receiving conveyor carried by said reciprocating member, said idle ware-receiving conveyor being adapted to engage said auxiliary conveyor at one end of the stroke of said reciprocating member and to be frictionally driven thereby in the same direction as said main conveyor.

15. The combination in a device for transferring glassware, comprising a conveyor, a member reciprocating above said conveyor, means carried by said reciprocating member for receiving the ware and means for setting said ware-receiving means in motion after the ware has been positioned thereon to transfer it from the reciprocating member to the conveyor.

16. The combination in a device for transferring glassware, comprising a conveyor, a reciprocating member, idler rollers carried by said reciprocating member for receiving the ware and means for rotating said ware-receiving rollers after the ware has been positioned thereon to transfer it to the conveyor.

17. The combination in a device for conveying glassware, comprising a conveyor, a vertically reciprocating member above said conveyor, idler rollers carried by said reciprocating member for receiving the ware, means for rotating said ware-receiving rollers after the ware has been positioned thereon to transfer it to the conveyor and means for adjusting the travel of said reciprocating member.

18. The combination in a device for transferring glassware from a forming machine, comprising a driven conveyor, a reciprocating member, an idle ware-receiving conveyor carried by said reciprocating member, means for adjusting the stroke of said reciprocating member to place the idle conveyor in ware receiving position at one end of its stroke, and means adapted to engage the idle conveyor when the said reciprocating member is at the opposite end of its stroke and drive it in the same direction as the driven conveyor.

19. The combination in a device for transferring glassware comprising a conveyor, a reciprocating member, means carried by said reciprocating member for receiving the ware, means for adjusting the stroke of said reciprocating member to place said ware-receiving means in position to engage the lower surface of the glassware at one end of its stroke, and means associated with said conveyor for setting said ware-receiving means in motion when said reciprocating member is at the opposite end of its stroke to transfer the ware positioned thereon to said conveyor.

20. A device for handling and transferring glassware, comprising in combination a driven conveyor, an idle conveyor for receiving the ware, a reciprocating member carrying said idle conveyor, means for adjusting the up stroke of said reciprocating member and means driven by said driven conveyor adapted to engage said idle conveyor when said reciprocating member is in its lowermost position and frictionally drive it in the same direction as the driven conveyor.

21. The combination in a device for transferring glassware, comprising a conveyor, idle ware-receiving means and mechanism for moving said idle ware-receiving means into and out of engagement with a portion of said conveyor to set the same in motion and transfer the ware placed thereon to the conveyor.

In testimony whereof, I have hereunto subscribed my name this 29th day of April, 1931.

JOHN MAYO.